United States Patent [19]

Suzuki

[11] Patent Number: 5,241,634
[45] Date of Patent: Aug. 31, 1993

[54] METHOD OF HANDLING SYSTEM CALLS TO AN OPERATING SYSTEM OF A COMPUTER BY SYSTEM SERVICE ROUTINES STORED AS FIRMWARE

[75] Inventor: Haruhisa Suzuki, Tokyo, Japan

[73] Assignee: OKI Electric Industry Co., Ltd., Tokyo, Japan

[21] Appl. No.: 340,525

[22] Filed: Apr. 19, 1989

[30] Foreign Application Priority Data

Apr. 26, 1988 [JP] Japan ............................ 63-101233

[51] Int. Cl.⁵ .............................................. G06F 9/06
[52] U.S. Cl. ............................ 395/375; 364/280.8; 364/261.3; 364/255.7; 364/262.4; 364/DIG. 1
[58] Field of Search ............... 395/425, 700, 375, 425, 395/700; 364/200 MS File, 900 MS File

[56] References Cited

U.S. PATENT DOCUMENTS

| 4,084,224 | 4/1978 | Appell | 395/700 |
|---|---|---|---|
| 4,495,563 | 1/1985 | McDonough | 364/200 |
| 4,514,805 | 4/1985 | McDonough | 395/725 |
| 4,575,817 | 3/1986 | Allen | 395/275 |
| 4,727,480 | 2/1988 | Albright | 395/500 |
| 4,727,486 | 2/1988 | Smith | 364/200 |
| 4,768,150 | 8/1988 | Chang | 395/700 |
| 4,928,237 | 5/1990 | Bealkowski | 395/700 |
| 5,003,466 | 3/1991 | Schan | 364/200 |

Primary Examiner—Robert B. Harrell
Assistant Examiner—Eric Coleman
Attorney, Agent, or Firm—Spencer, Frank & Schneider

[57] ABSTRACT

A computer has an external memory, and a CPU having an internal memory, typically a ROM, with an operating system being stored partly as firmware in the internal memory and partly as software in the external memory. When an operating-system function is requested, the computer checks whether or not the requested operating-system function is stored as firmware. If it is, the requested operating-system function is executed. If it is not, the software in the external memory is searched for the requested operating system function.

11 Claims, 2 Drawing Sheets

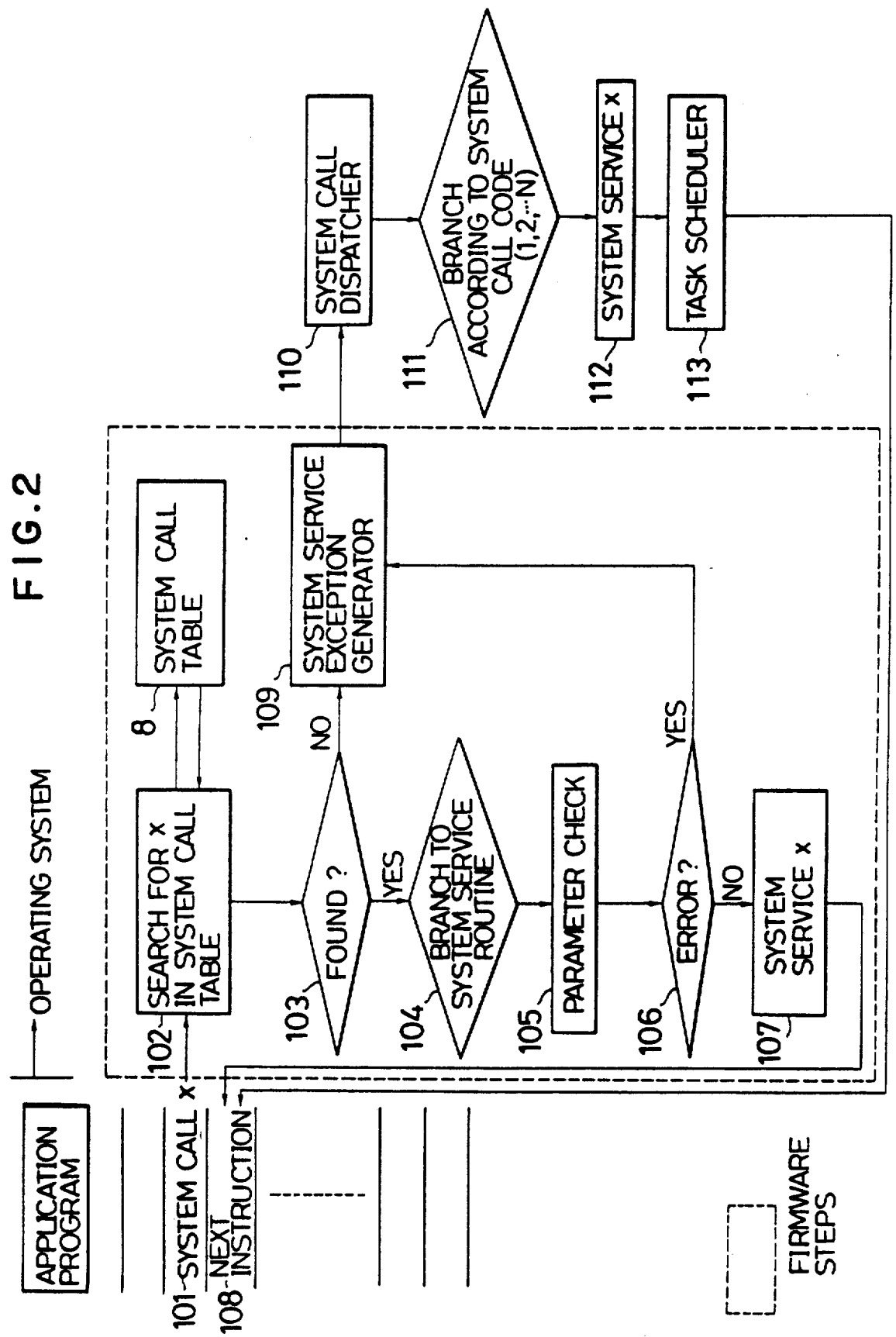

METHOD OF HANDLING SYSTEM CALLS TO AN OPERATING SYSTEM OF A COMPUTER BY SYSTEM SERVICE ROUTINES STORED AS FIRMWARE

BACKGROUND OF THE INVENTION

This invention relates to a method of handling requests for service by the operating system of a digital computer, such requests being herein referred to as system calls; more particularly, it relates to a method of handling system calls in firmware.

The term firmware refers herein to computer programs and data stored in a memory device such as a read-only memory (ROM) disposed in the central processing unit of the computer. In the case of a single-chip microcomputer, for example, firmware may be stored in an on-chip ROM from which instructions can be fetched and data read at high speed.

The term software herein refers to computer programs and data stored outside the central processing unit, in the computer's main random-access memory (RAM), for example, or an external memory device such as a rotating magnetic disk. In the case of a single-chip microcomputer, software may also be stored in separate ROM chips. In general it takes the central processing unit longer to fetch software instructions and data than firmware instructions and data, so software programs execute-less rapidly than firmware programs.

One of the most important components of a computer's software is its operating system. The operating system performs general control functions, oversees the execution of tasks such as application programs, and provides services which different application programs may use in common. These services are executed by system service routines, which are invoked from application programs by system call instructions.

The operating system comprises a plurality of programs. One of the programs in a typical operating system is a task scheduler, which compares the priority of the tasks currently ready for execution and selects the task with the highest priority. Another is a system call dispatcher, which analyzes system calls and decides which system service routine to execute. The system service routines are of course also part of the operating system.

A typical operating system handles system calls in the following manner. A system call instruction in an application program generates a system call exception which causes the system call dispatcher to begin executing. The system call dispatcher analyzes the system call, determines which system service routine to execute, and branches to the selected system service routine. Execution of this routine provides the service requested by the application program. At the end of the system service routine, the task scheduler is invoked to select the next task. Ultimately control returns from the task scheduler to the application program.

To obtain higher speed, some operating-systems have part of their functions stored in firmware. In the prior art, the operating-system functions stored in firmware commonly comprise the code that generates the system call exception and code used by frequently-called system service routines. System calls for services using code stored in firmware are then handled in the same way as described above, except that the system service routine contains an instruction that branches from the software part of the routine to the firmware code used by the routine, and the firmware code ends by returning to the software part of the routine.

A problem with this scheme for handling system calls in firmware is that even if substantially all of the code of a system service routine is stored in firmware, handling of the corresponding system call still requires extensive execution of operating-system software, including the system call dispatcher and task scheduler. This software overhead unnecessarily delays the operating system's response to the system call.

Another problem is that each time a new system service function is stored in firmware, the operating-system software must be altered so that the software system service routine can branch to the new firmware code. That is, whenever the system firmware is updated, the system software must also be updated. These updates may give the system greater speed, but system maintenance would be more convenient and less expensive if that speed could be obtained by updating the firmware alone, leaving the software in its existing state. This problem is particularly acute in microcomputer systems in which the operating-system software is permanently stored in semiconductor memory chips and cannot readily be altered.

SUMMARY OF THE INVENTION

It is accordingly an object of the present invention to enable the handling of system calls in firmware alone, without software overhead.

It is a further object of the present invention to enable operating-system firmware to be updated without requiring operating-system software also to be updated.

System calls are handled, according to this invention, in the following way: a system call first invokes a firmware checking program; the firmware checking program decides, by searching a system call table for example, whether the system service routine requested by the system call is stored in firmware; if it is, the checking program branches to the firmware system service routine, which executes the requested service, then returns to the instruction following the system call; if it is not, the checking program branches to a system service exception generator which generates a system service exception, after which handling of the system call proceeds in software as in the prior art.

BRIEF DESCRIPTION OF THE DRAWINGS

FIG. 2 is a flowchart illustrating system-call handling by the computer in FIG. 1.

DETAILED DESCRIPTION OF THE EMBODIMENTS

Figure 1:
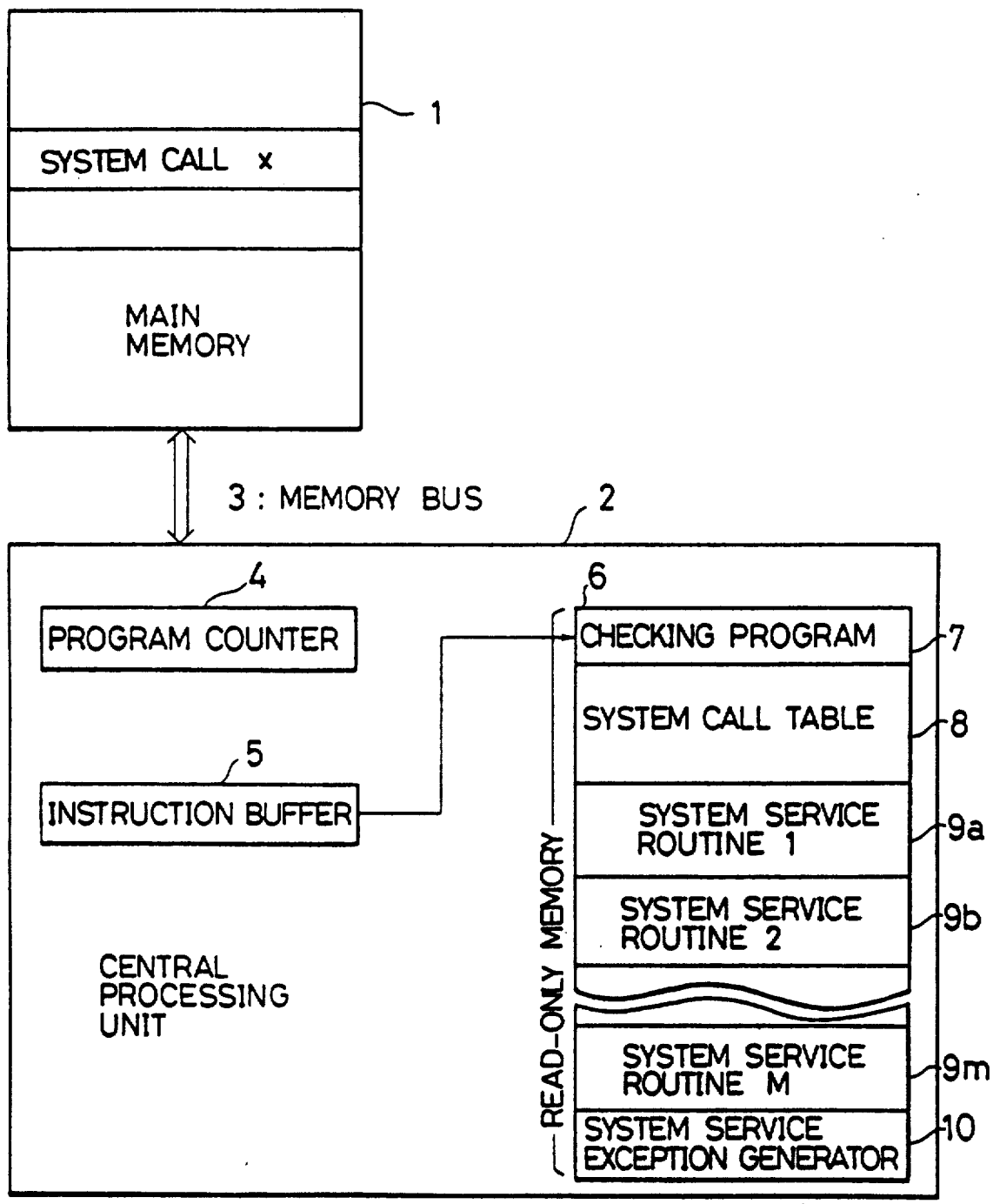
FIG. 1 is a block diagram illustrating a computer with novel firmware for handling system calls.

A novel method of handling system calls in firmware will be described with reference to FIG. 1, which is a block diagram of a computer system having novel firmware for handling system calls, and FIG. 2, which is a flowchart showing how system calls are handled.

The computer system shown in FIG. 1 comprises an external main memory 1 for storing instructions and data, a central processing unit 2 for executing instructions, and a memory bus 3 by which instructions and data are transferred between the main memory 1 and the central processing unit 2. The central processing unit 2 comprises a program counter 4, an instruction buffer 5, and a read-only memory 6. The central processing unit 2 also comprises apparatus such as an arithmetic-and-logic unit, not shown in the drawing, for executing instructions.

The program counter 4 contains the address in the main memory 1 or the read-only memory 6 of the next instruction to be executed, and is updated as each instruction is executed. The instruction buffer 5 stores the instruction currently being executed. The read-only memory 6 contains firmware comprising a checking program 7, a system call table 8, system service routines 9a, 9b, ..., 9m, and a system service exception generator 10.

The checking program 7 comprises instructions that search for a given system call code in the system call table 8 and branch to the corresponding system service routine if the system call code is found, or to the system service exception generator 10 if the system call code is not found. The system call table 8 comprises a list of system call codes having system service routines stored in firmware, and other information such as the addresses of those system service routines. The system service routines 9a, 9b, ..., 9m comprise programs for providing requested services and performing other necessary functions such as checking parameters. The system service exception generator 10 generates a system service exception that starts the system call dispatcher in the operating-system software.

The handling of a system call by an operating system partially stored in firmware as shown in FIG. 1 will be described with reference to the flowchart in FIG. 2. The left side of FIG. 2 represents operations performed by application programs. The right side represents operations performed by the operating system. The part enclosed in the dashed line represents operating-system functions embedded in firmware.

In step 101 in FIG. 2 a system call instruction SCAL x occurs in an application program, x being a code identifying the specific service requested. Execution of the SCAL x instruction first invokes the checking program 7 in FIG. 1. Specifically, the address of the next instruction of the application program is saved from the program counter 4 to a stack area in main memory 1, for example, then the address of the first instruction in the checking program 7 is moved into the program counter 4, causing this instruction to be fetched into the instruction buffer 5 and executed.

In step 102, the checking program 7 searches the system call table 8. In step 103 the checking program 7 decides whether the code x is listed in the system call table 8. If it is, in step 104 the checking program 7 branches to the corresponding system service routine 9, this being one of the system service routines 9a, 9b, ..., 9m stored in firmware. If the code x is not found in the system call table 8, the checking program 7 branches to the system service exception generator 10; this case will be described in more detail later.

Assuming that the code x is found in the system call table 8, next execution of the corresponding system service routine 9 begins. The system service routine 9 may include a parameter check, performed in step 105, for verifying the presence of necessary parameter information supplied by the application program. If the system service routine 9 finds a parameter error, in step 106 it branches to the system service exception generator 10. Otherwise, in step 107 the system service routine 9 continues executing, thereby performing the service requested by the system call SCAL x.

The system service routine 9 ends by returning control to the application program. Specifically, the address of the next instruction in the application program is restored from the stack to the program counter 4, causing the application program to resume execution from that instruction in step 108.

In the case just described the system call is entirely handled by firmware, with no software overhead. The requested system service is therefore provided more quickly than in the prior art.

Next the system-call handling will be described in the case in which the code x is not listed in the system call table 8, or the system service routine 9 finds a parameter error. In this case control passes from step 103 or step 106 to the system service exception generator 10, which generates a system service exception in step 109. The system service exception causes the system call dispatcher to begin execution in step 110.

The system call is then served in the same way as in the prior art. In step 111 the system call dispatcher branches to the corresponding system service routine in software. In step 112 the system service routine executes the requested service function, or takes action responsive to the parameter error. In step 113, after the end of the system service routine, the task dispatcher selects the next task to execute. This may be the original application program task, in which case the task dispatcher branches to the next instruction in the application program (step 108), or another task, in which case the task dispatcher switches task contexts and branches to the selected task, resumption of the original application program being deferred to a later time.

Since the process performed by the operating-system software in steps 110 to 113 is exactly the same as in the prior art, the method of handling system calls in firmware according to this invention can be used without making changes to existing software, even to operating-system software. For example, it becomes possible to experiment with the handling of system calls in firmware on a trial basis to evaluate the performance improvement thus realized without making software revisions. Alternatively, different system service routines can be stored in firmware to suit the needs of different computer application systems, or to take advantage of different amounts of firmware storage space provided by different central processing unit models, again without requiring software revisions.

The scope of this invention is not limited to the system call-handling flow in FIG. 2, but includes many variations that will be obvious to one skilled in the art. For example, the parameter check performed in step 105 in FIG. 2 can also be performed in step 102, and action responsive to parameter errors can be taken in step 110 instead of step 112. Also, the system call table 8 need not contain a list of system codes but may contain other information enabling the checking program 7 to decide whether a given system service routine is stored in firmware, such as, for each system call, the address of the corresponding system service routine if it is stored in firmware, and a special code if the corresponding system service routine is not stored in firmware.

What is claimed is:

1. A method of handling system calls by means of a central processing unit in a computer, said system calls being calls to an operating system during execution of an application program, said operating system being stored partly as firmware in an internal memory internal to said central processing unit and partly as software in an external memory external to said central processing unit and having at least one system service routine stored as firmware, comprising:

- a first step of executing a system call instruction requesting service by a system service routine in said operating system;
- a second step, performed by the firmware in response to the system call instruction, of deciding whether said system service routine is stored as firmware;
- a third step, performed if said system service routine is stored as firmware, of executing said system service routine;
- a fourth step, performed at the end of said system service routine if said system service routine is stored as firmware, of returning to an instruction next to said system call instruction in the application program;
- a fifth step, performed if said system service routine is not stored as firmware, of generating a system call exception; and
- a sixth step, performed in response to the system call exception, of branching to the system service routine stored as software.

2. A method according to claim 1, wherein said system call instruction has a certain system call code, and said second step comprises the steps of:

searching a system call table stored as firmware; and
deciding whether said certain system call code is stored in said system call table.

3. The method of claim 1, wherein said third step includes a step of checking parameters and branching to said fifth step if a parameter error is found.

4. The method of claim 1, wherein said fifth step of generating a system call exception is performed by firmware.

5. The method of claim 1, further comprising:

a seventh step, performed by the software subsequent to said sixth step, of executing said system service routine;

an eighth step, performed by the software subsequent to said seventh step, of selecting a task to execute next; and a ninth step, performed by the software subsequent to said eighth step, of branching to the task selected in the eighth step.

6. The method of claim 1, wherein said internal memory is a read-only memory.

7. The method of claim 1, wherein said internal memory is a memory built in a semiconductor chip in which said central processing unit is also built.

8. A computer having an external memory, and a central processing unit having an internal memory, with an operating system stored partly as software in said external memory and partly as firmware in said internal memory, wherein the part of said operating system stored as the firmware comprises;

one or more system service routines;

a system call table listing codes corresponding to system service routines stored as said firmware;

a system service exception generator; and a checking program for searching said system call table, deciding whether a given code is stored in said system call table, branching to the corresponding system service routine if said code is stored in said system call table, and branching to said system service exception generator if said code is not stored in said system call table.

9. The computer of claim 8, further comprising one or more application programs stored as software in said external memory, wherein:

said application programs include system call instructions having codes corresponding to system service routines;

said system call instructions branch to said checking program; and said system service routines stored as firmware comprise instructions for returning to said application programs.

10. The computer of claim 8, wherein said internal memory is a read-only memory.

11. The method of claim 8, wherein said internal computer is a memory built in a semiconductor chip in which said central processing unit is also built.

* * * * *